US006973216B2

(12) United States Patent
Sekino

(10) Patent No.: US 6,973,216 B2
(45) Date of Patent: Dec. 6, 2005

(54) IMAGE CODING APPARATUS AND METHOD

(75) Inventor: Masanori Sekino, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 605 days.

(21) Appl. No.: 10/086,810

(22) Filed: Mar. 4, 2002

(65) Prior Publication Data

US 2002/0191853 A1 Dec. 19, 2002

(30) Foreign Application Priority Data

Jun. 18, 2001 (JP) ............................. 2001-182955

(51) Int. Cl.[7] ................................................ G06K 9/36
(52) U.S. Cl. ...................... 382/236; 382/232; 382/238; 382/239
(58) Field of Search ................................ 382/238, 239, 382/251, 236, 232, 243, 233, 252; 375/240.08; 358/1.9, 462, 465, 447, 3.03, 3.04

(56) References Cited

U.S. PATENT DOCUMENTS

| | | | | |
|---|---|---|---|---|
| 5,107,346 A | * | 4/1992 | Bowers et al. | 358/447 |
| 5,828,789 A | | 10/1998 | Yokose et al. | 382/239 |
| 5,848,198 A | * | 12/1998 | Penn | 382/276 |
| 6,445,826 B1 | * | 9/2002 | Kadono | 382/243 |

FOREIGN PATENT DOCUMENTS

| | | | | |
|---|---|---|---|---|
| JP | A 5-328136 | 12/1993 | ............ | H04N 1/41 |
| JP | 410311756 | * 11/1998 | ............ | G01J 3/46 |

OTHER PUBLICATIONS

Tsujii et al., "Anatomic Region-Based Dynamic Range Compression for Chest Radiographs Using Warping Transformation of Correlated Distribution", IEEE Transactions on Medical Imaging, vol. 17, No. 3, Jun. 1998, pps., 407-418.*

* cited by examiner

Primary Examiner—Anh Hong Do
(74) Attorney, Agent, or Firm—Oliff & Berridge, PLC

(57) ABSTRACT

A pixel value change processing section corrects the value of a current pixel in an input image so that the size of a code produced by a coding processing section is reduced, and outputs a changed pixel value. When predictive coding is employed, the pixel value change processing section outputs the same pixel value as that which is predicted by a predictor. When arithmetic coding is employed, the pixel value change processing section outputs a pixel value at which a dominant symbol is obtained in the arithmetic coding. The coding processing section produces a code from the changed pixel value 310. The pixel value change processing section produces an error value between the current pixel value and the changed pixel value. An error distribution processing section produces an error distribution value from the error value and adds the error distribution value to the pixel value of the input image.

10 Claims, 6 Drawing Sheets

IMAGE CODING APPARATUS AND METHOD

BACKGROUND OF THE INVENTION

1. Field of the Invention

The present invention relates to a lossy coding technique for an image.

2. Description of the Related Art

In this field, there are techniques such as JPEG (Joint Photographic Experts Group, ITU-T T. 81) based on DCT (Discrete Cosine Transform), JPEG-LS (ITU-T T. 87) based on predictive coding, and a method due to color subtraction and arithmetic coding (JP-A-Hei.5-328136).

Image coding is performed by using correlation between neighboring pixel values. In a CG or a character image, generally, it is often that neighboring pixel values strictly coincide with one another, and the value of a current pixel can be predicted from neighbour pixels with high accuracy. Therefore, lossless predictive coding and runlength coding are widely used.

By contrast, in a natural image, neighboring pixel values have finely different values, and it is difficult to strictly predict the pixel value of a current pixel. Therefore, a lossy coding system such as that used in the conventional art is necessary.

JPEG and JPEG-LS are coding systems which uses a phenomenon that low-frequency components are dominant in a natural image, and, for an image in which pixel values are smoothly changed, i.e., a natural image, can attain a high compression ratio while preserving a high image quality.

JPEG-LS is one of predictive coding systems, and performs coding by obtaining a predicted value on the basis of the situation of neighbour pixels, and quantizing a prediction error between the predicted value and the actual pixel value. For a flat portion where the inclination of neighbour pixels is equal to or smaller than a fixed value, however, runlength coding is performed. During a process of performing runlength coding and quantizing a prediction error, a change may occur in an image. In JPEG-LS, this change is discarded. FIG. 9 shows a processing flow for one pixel. As shown in FIG. 9, first, it is judged whether a pixel value is in a flat portion where the inclination is equal to or smaller than the fixed value or not (501). If the pixel value is in the flat portion, runlength coding is performed (502). If the pixel value is not in the flat portion, pixel value prediction is performed (503), the prediction error is quantized (504), and predictive error coding is then performed (505).

The method due to color subtraction and arithmetic coding is a method in which image data are reduced by color subtraction and the data are further reduced by performing entropy coding. This method is used mainly in an apparatus of restricted gradation levels, such as a facsimile apparatus or a printer.

However, a method based on properties of a natural image, such as JPEG or JPEG-LS which has been described above has a defect that, when the method is applied to an image having edges such as a CG or a character, noises characteristic of compression are produced in the periphery of an edge portion of the image and therefore the compression ratio cannot be improved while preserving the image quality. In the case where a natural image is mixed with a CG or a character, in order to attain both a high image quality and a high compression ratio, therefore, it is required to first perform area separation and then apply different compressions on the natural image portion and the CG or character portion. This increases the apparatus scale and reduces the process speed. In JPEG-LS, since an error which is caused as a result of an image change is discarded, there is a further defect that it is not ensured to preserve the density of the whole image.

The method due to color subtraction and arithmetic coding has a defect that the gradation property of the whole image is degraded by color subtraction, and another defect that a statistical process such as that of obtaining a histogram of the image must be additionally performed to perform color subtraction and hence the process time period is prolonged.

The invention has been conducted in order to eliminate the above-discussed defects of the conventional art. It is an object of the invention to provide a lossy coding method which is high in speed and image quality and simple and attains a high compression ratio irrespective of the contents of an image.

SUMMARY OF THE INVENTION

In the invention, the pixel value of a current pixel in an image data is changed, a resulting error is distributed to neighbour pixels, and the changed image is then coded. The change of the pixel value of the current pixel is performed so as to reduce the code quantity, thereby solving the problems.

In the invention, it is not required to assume that the input image is a natural image, and a process of degrading high-frequency components is not involved. In the case where a natural image is mixed with a CG or a character image, therefore, area separation is not necessary, and hence it is possible to simplify and hasten the process procedure.

In the pixel value changing process in the invention, unlike the color subtracting process, only a pixel value which is a factor of increasing the coding is changed, so that degradation of an image is reduced. The pixel value change is caused to be macroscopically inconspicuous by distributing an error produced by the change of a pixel value to neighbour pixels, thereby realizing a high image quality. Unlike the color subtracting process, a previous statistical process is not necessary. Therefore, the number of operations of scanning the input image is reduced, and the procedure is simplified.

The invention will be further described. According to one aspect of the invention, in order to attain the object, an image coding apparatus has a pixel value changing section for changing a pixel value of a current pixel in an image data, an error distributing section for distributing an error value produced in the pixel value changing section to neighbour pixels, and an image coding section for coding the pixel value which is changed by the pixel value changing section, in which the pixel value changing section changes the pixel value so as to reduce a code quantity in the image coding section.

According to the configuration, the pixel value is changed so as to reduce the code quantity, and the difference due to the change is basically faithfully distributed to neighbour pixels so that an image can be preserved. Therefore, an image can be compressed at a high compression ratio and a high speed while the image quality is not largely degraded.

The invention can be realized not only as an apparatus or a system but also as a method. Of course, a part of the invention can be realized in the form of a computer program.

The above-mentioned aspect of the invention, and other aspects of the invention are set forth in the appended claims, and will be described in detail with reference to the following embodiments.

DETAILED DESCRIPTION OF THE PREFERRED EMBODIMENTS

Hereinafter, embodiments of the invention will be described.

[Embodiment 1]

Figure 1:
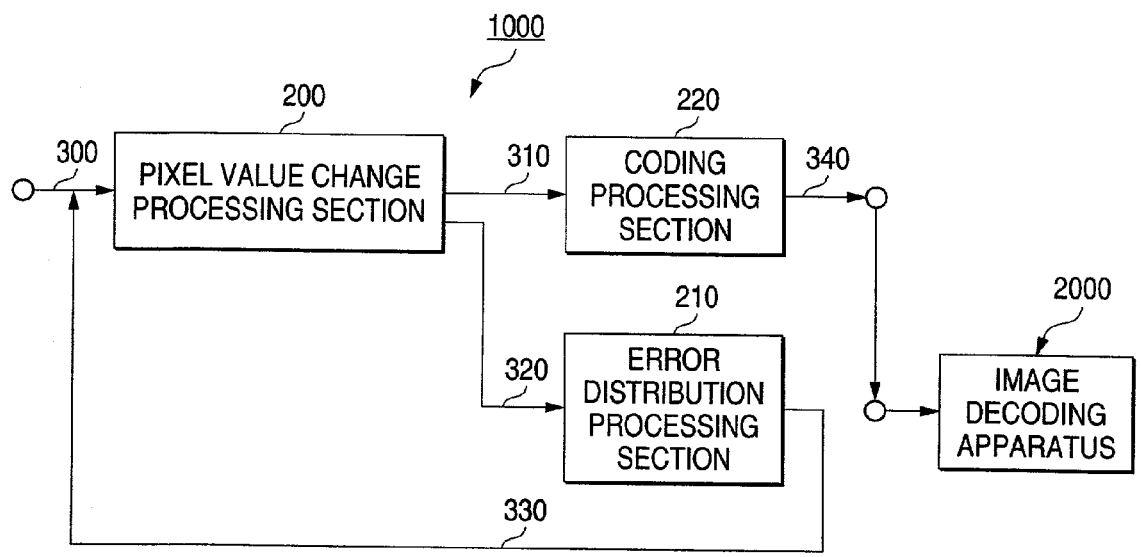
FIG. 1 is a block diagram showing an image coding and decoding apparatus of Embodiment 1 of the invention.

FIG. 1 is a diagram showing Embodiment 1 of the invention. An image coding apparatus 1000 of the embodiment comprises a pixel value change processing section 200, an error distribution processing section 210, and a coding processing section 220. A code which is coded in the image coding apparatus 1000 are sent to an image decoding apparatus 2000 to be decoded thereby.

The coding processing section 220 receives a changed pixel value 310 which is produced by the pixel value change processing section 200, and produces a code 340. The image coding processing section 220 is realized by an arbitrary existing image coding technique. The image coding technique may be a lossless coding technique or a lossy one. The image decoding apparatus 2000 decodes the output code of the coding processing section 220, and is realized by a corresponding decoding technique.

The pixel value change processing section 200 corrects the value of a current pixel in an input image 300 so that the code quantity produced by the coding processing section 220 is reduced, and outputs the changed pixel value 310. In the case where the coding process uses predictive coding, for example, the pixel value change processing section outputs the same pixel value as that which is predicted by a predictor for predictive coding. In the case where the coding process uses arithmetic coding, for example, the pixel value change processing section outputs a pixel value at which a dominant symbol is obtained in the arithmetic coding. The pixel value change processing section 200 produces an error value 320 between the current pixel value and the changed pixel value 310.

Figure 7:
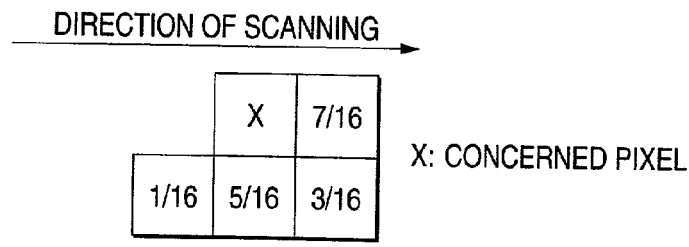
FIG. 7 shows a weighting matrix which is used in an error diffusion method or a minimum average error method.

The error distribution processing section 210 receives the error value 320 which is produced by the pixel value change processing section 200, produces an error distribution value 330, and adds the error distribution value to the pixel value of the input image 300. In accordance with an error diffusion method or a minimum average error method using a weighting matrix of FIG. 7, for example, the error distribution value is calculated by multiplying the error value 320 by the value of the weighting matrix.

In the embodiment, the scanning operation on an image is performed only one time. Therefore, the embodiment has an advantage that the process is rapidly performed.

[Embodiment 2]

Figure 2:
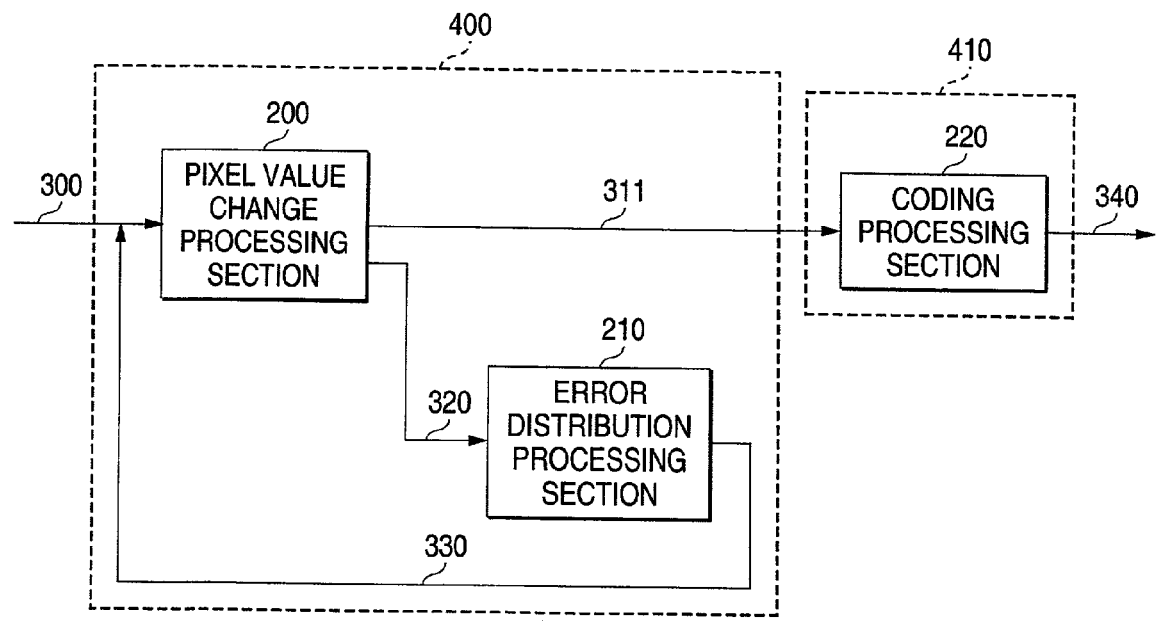
FIG. 2 is a block diagram showing an image coding apparatus of Embodiment 2 of the invention.

FIG. 2 is a diagram showing Embodiment 2 of the invention. The components identical with those of FIG. 1 are denoted by the same reference numerals, and their description is omitted. In the embodiment also, the image decoding apparatus corresponds to the coding processing section 220, and is not shown in the figure.

Referring to FIG. 2, an image change processing section 400 performs a process of changing a pixel value on the entire image, and outputs a changed image 311. After the entire image is processed, the image change processing section 400 supplies the changed image 311 to an image coding processing section 410. The image coding processing section 410 receives the changed image 311, and produces the code 340.

In the embodiment, the image change processing section 400 and the image coding processing section 410 respectively perform processes which are basically individual from each other, and hence are not required to be operated for each image data in a synchronized manner. As a result, the embodiment has an advantage that an existing image coding routine or image coding apparatus can be used as it is as the image coding processing section 410.

[Embodiment 3]

Figure 3:
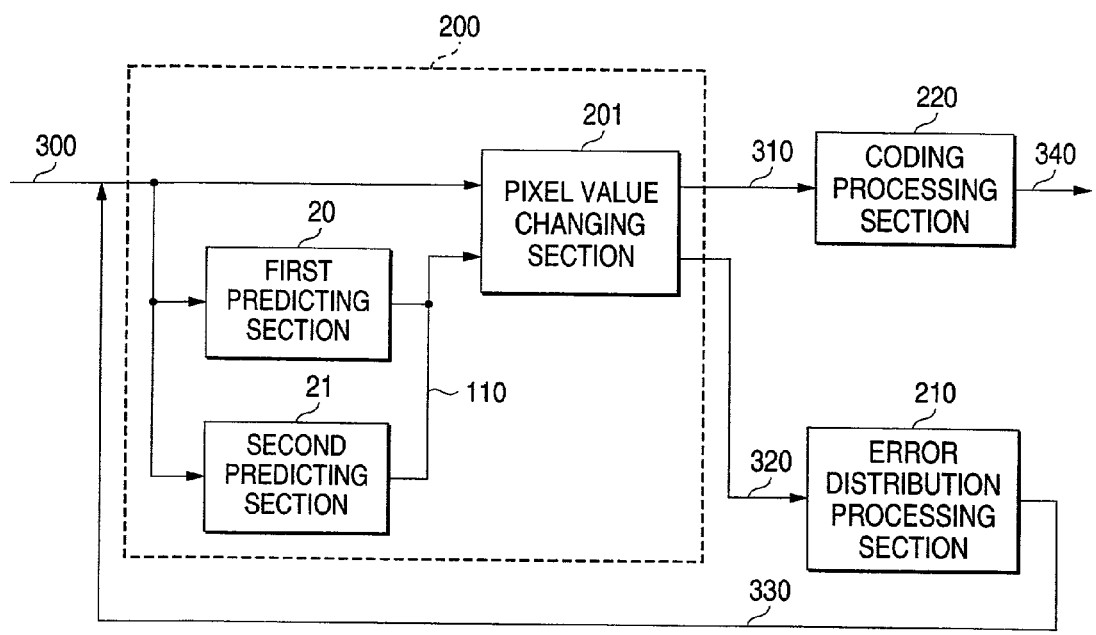
FIG. 3 is a block diagram showing an image coding apparatus of Embodiment 3 of the invention.

FIG. 3 is a diagram showing Embodiment 3 of the invention. The components identical with those of FIG. 1 are denoted by the same reference numerals, and their description is omitted. In the embodiment also, the image decoding apparatus corresponds to the coding processing section 220, and is not shown in the figure.

The configuration of the coding processing section 220 in the embodiment will be briefly described.

Figure 4:
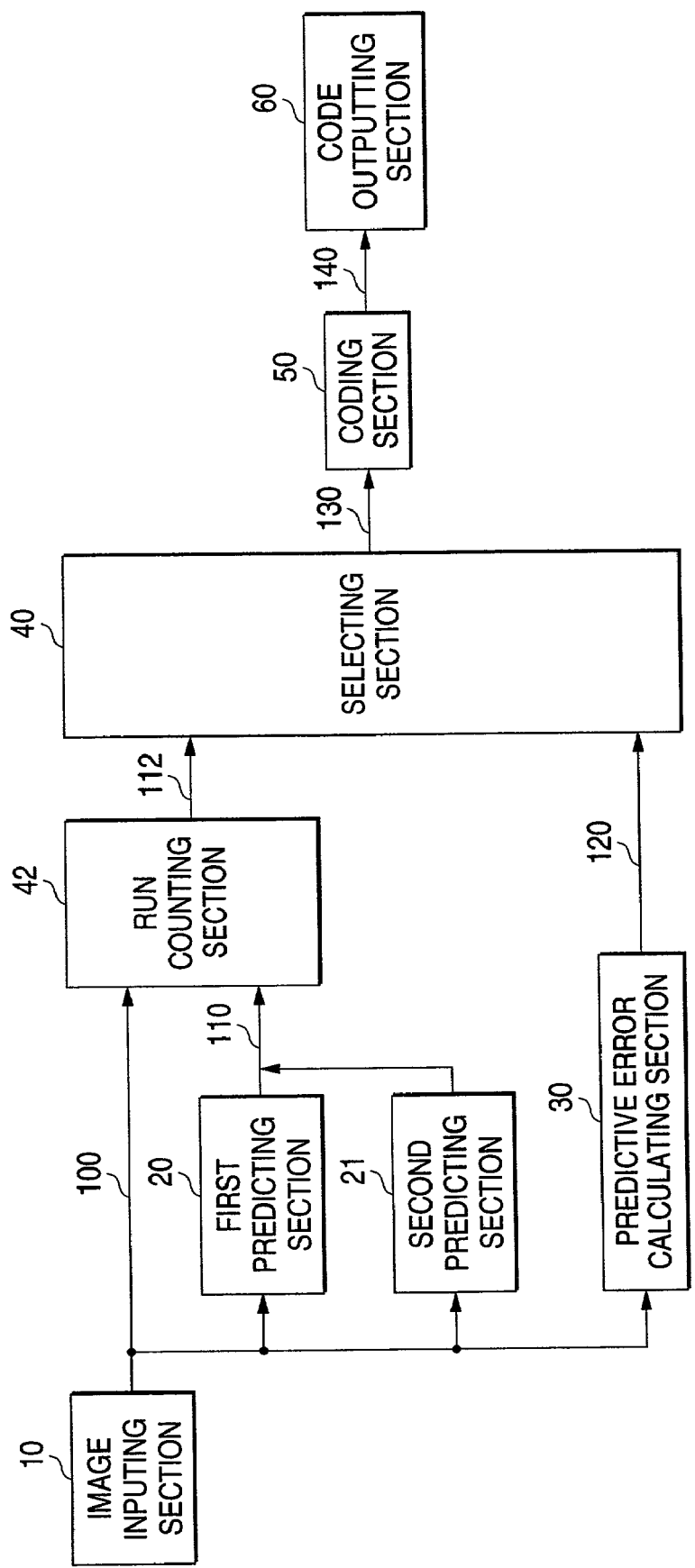
FIG. 4 is a block diagram showing a coding processing section 220 of Embodiment 3.

FIG. 4 shows the configuration of the coding processing section 220 in the embodiment. In the figure, 10 denotes an image inputting section, 20 denotes a first predicting section, 21 denotes a second predicting section, 30 denotes a predictive error calculating section, 40 denotes a selecting section, 42 denotes a run counting section, 50 denotes a coding section, 60 denotes a code outputting section, 100 denotes an image data, 110 denotes a predicted value data, 112 denotes a predicted value data including a run data, 120 denotes a prediction error data, 130 denotes a prediction status data, and 140 denotes a code data.

Each of the first and second predicting sections 20 and 21 predicts the pixel value of a current pixel on the basis of the image data 100 by a predetermined technique, and sends the predicted value as the predicted value data 110 to the selecting section 40. On the basis of the image data 100, the predictive error calculating section 30 predicts the pixel value of the current pixel by a predetermined technique, subtracts the predicted value from the actual pixel value of the current pixel, and sends the resulting value as the prediction error data 120 to the selecting section 40. The selecting section 40 detects from the image data 100 and the predicted value data 110 whether the prediction in the current pixel is correct or not. If there is a predicting section the prediction of which is correct, the identification number of the predicting section is converted into the prediction status data 130 and then sent to the coding section 50. If all of the predicting sections miss prediction, the prediction error data 120 is converted into the prediction status data 130 and then sent to the coding section 50.

Returning to FIG. 3, the first and second predicting sections of FIG. 3 perform the same processes as those performed by the first and second predicting sections of FIG. 4.

A pixel value changing section 201 compares the predicted value data 110 with the input image 300. If the difference between the data and the image is smaller than a predetermined value, the pixel value changing section outputs the predicted value data 110 as the changed pixel value 310, and outputs also the difference between the predicted value data 110 and the input image 300 as the error value 320. If the difference between is equal to or larger than the predetermined value, the pixel value changing section outputs the current pixel value of the input image 300 as it is as the changed pixel value, and outputs 0 as the error value 320. Namely, the pixel value changing section 201 does not output an error value which is equal to or larger than the predetermined value.

In the embodiment, a tradeoff between degradation of an image due to the change of the pixel value and the size of the code 340 can be realized by the control of the pixel value changing section 201 using the predetermined value.

[Embodiment 4]

Figure 8:
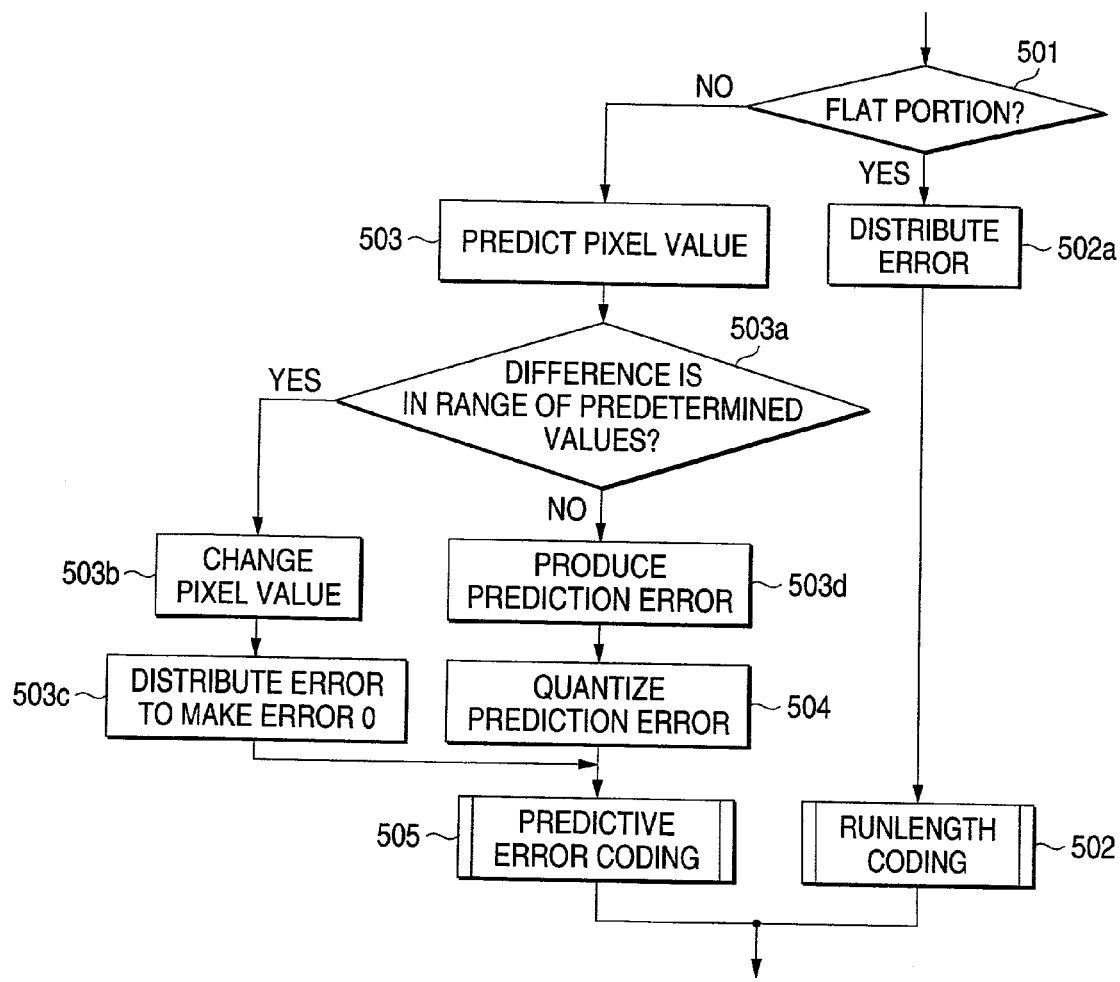
FIG. 8 is a chart showing an image processing flow for one pixel in Embodiment 4 of the invention.
Figure 9:
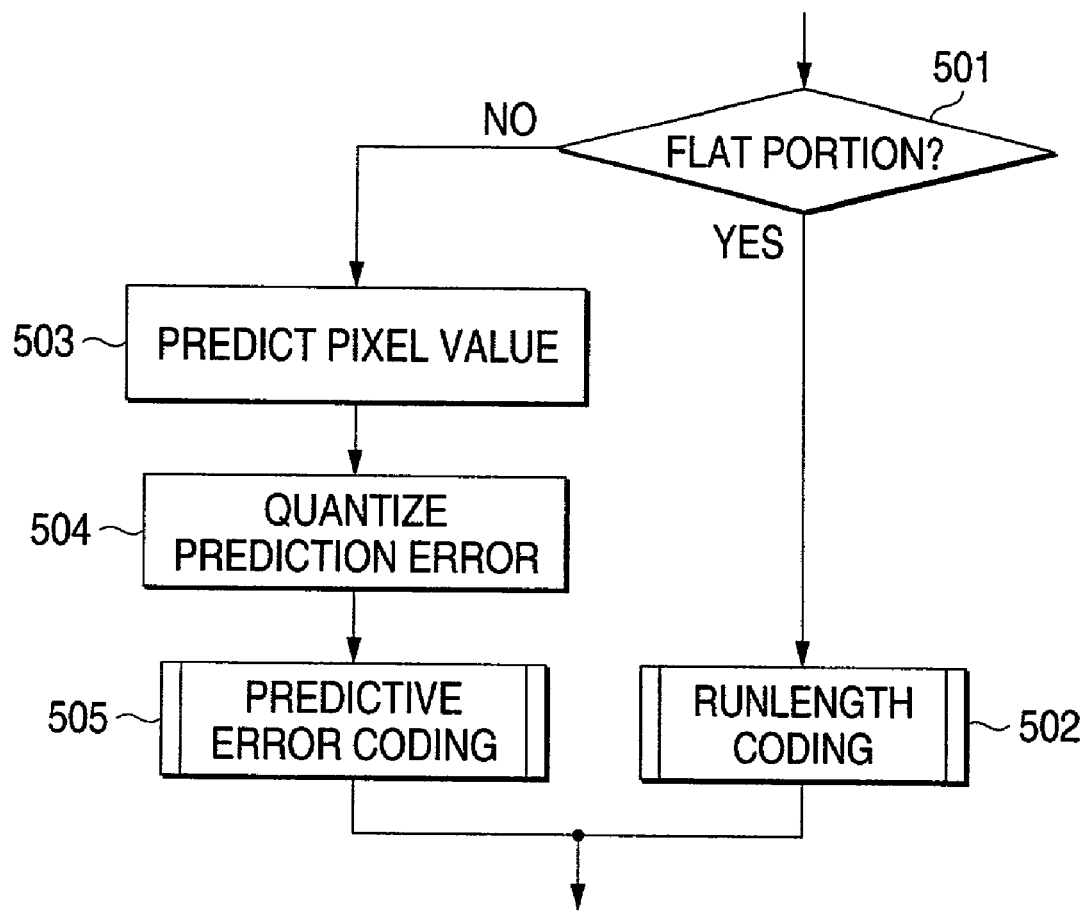
FIG. 9 is a chart showing an image processing flow for one pixel in JPEG-LS.

In the embodiment, the invention is applied to coding in JPEG-LS. FIG. 8 shows an image processing flow for one pixel in the embodiment. In the figure, portions corresponding to those of the processing flow for one pixel in JPEG-LS shown in FIG. 9 are denoted by the same reference numerals. By the application of the invention to coding in JPEG-LS, the image quality in JPEG-LS can be improved.

Referring to FIG. 8, after the pixel value is predicted (503), it is judged whether the difference between the predicted value and the actual pixel value is in a range of the predetermined values or not (503a). If yes, the followings are performed instead of the prediction error quantization 504. The pixel value is changed so as not to produce a prediction error (503b), an error which is produced by the change is distributed to neighbour pixels (503c), and 0 is coded as a prediction error by the predictive error coding 505. If the prediction error exceeds the predetermined value, a prediction error is produced in the same manner as the conventional art (503d), and the prediction error is quantized (504).

Also an error of the pixel value which is produced by the runlength coding 502 is distributed to the neighbour pixels (502a).

In the embodiment, the image quality can be improved by distributing an error value. However, improvement of the compression ratio with respect to JPEG-LS cannot be expected because part of information which is discarded in JPEG-LS is preserved as a result of the distribution of the error value.

Figure 5:
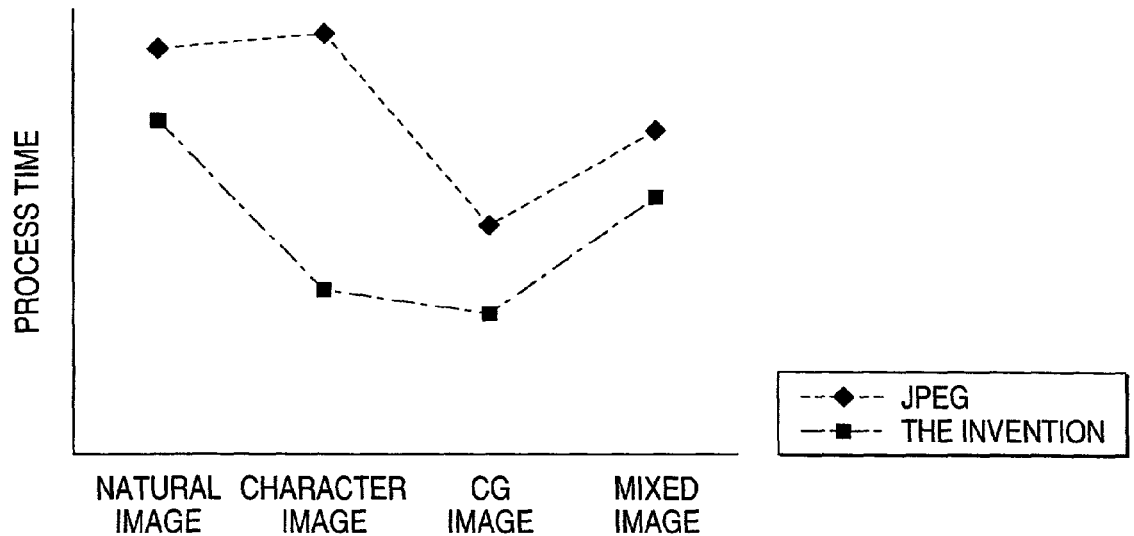
FIG. 5 shows measurement results of a time period of coding an image in Embodiment 3 of the invention and JPEG.
Figure 6:
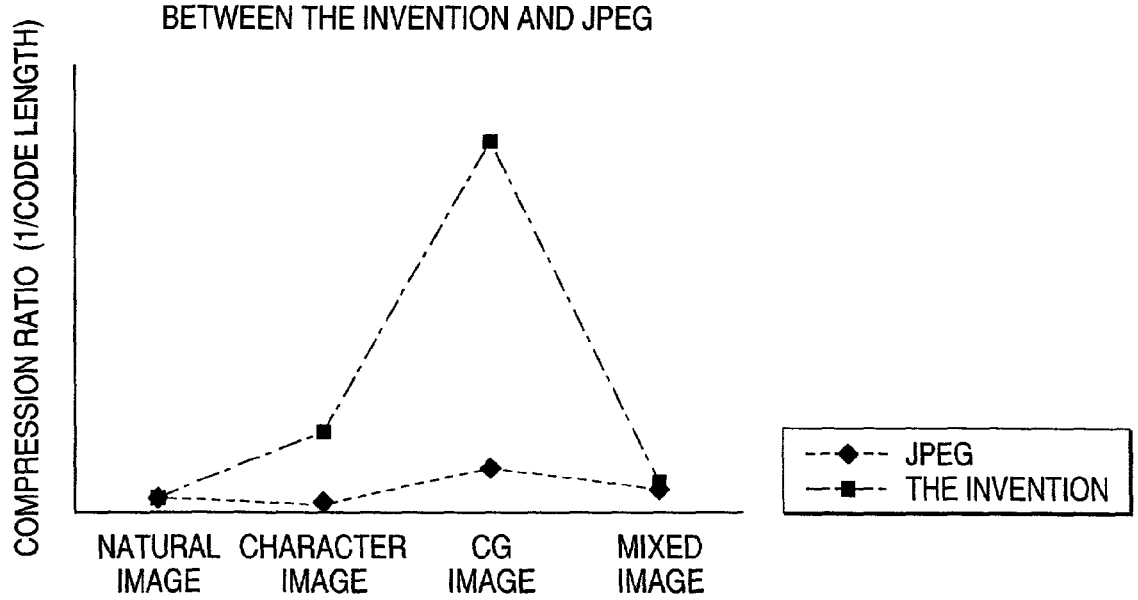
FIG. 6 shows measurement results of a compression ratio in Embodiment 3 of the invention and JPEG.

As described above, according to the embodiment, lossy coding which is high in speed and image quality and simple and attains a high compression ratio irrespective of the contents of an image is enabled. Results of coding experiments in which Embodiment 3 of the invention and JPEG were compared with each other in the process speed and the compression ratio are shown in FIGS. 5 and 6. From the figures, it is apparent that the embodiment of the invention can provide coding which is high in speed and attains a high compression ratio.

As described above, according to the invention, it is possible to provide lossy coding which is high in speed and image quality and simple and attains a high compression ratio irrespective of the contents of an image.

What is claimed is:

1. An image coding apparatus comprises:
   a pixel value changing section for changing a pixel value of a current pixel in an image data;
   an error distributing section for distributing an error value produced in the pixel value changing section to neighbour pixels; and
   an image coding section for coding the pixel value which is changed by the pixel value changing section,
   wherein the pixel value changing section changes the pixel value so as to reduce a code quantity in the image coding section.

2. The apparatus according to claim 1, wherein the image coding section employs lossless coding.

3. The apparatus according to claim 1, wherein the image coding section employs predictive coding.

4. The apparatus according to claim 1, wherein the error distributing section distributes an error by an error diffusion method.

5. The apparatus according to claim 1, wherein the error distributing section distributes an error by a minimum average error method.

6. The image coding apparatus claim 1, wherein the pixel value changing section does not perform a change which produces an error that is not less than a predetermined value.

7. The apparatus according to claim 1, wherein after the pixel value change is performed on a whole of the image data, the image coding section performs coding.

8. The apparatus according to claim 1, wherein the image coding section comprises:
   image inputting means for inputting an image;
   plural pixel value predicting means for predicting a pixel value of a current pixel which is in an image input from the image inputting means and which is an object to be coded by different predicting techniques;
   prediction error calculating means for calculating an error between the pixel value of the current pixel which is in the image input from the image inputting means and a predicted value which is predicted by a predetermined predicting technique;
   coincidence judging means for judging whether each of the pixel values which are respectively predicted by the plural pixel value predicting means coincides with the pixel value of the current pixel;
   selecting means for, on the basis of a judgement output of the coincidence judging means, outputting one of identification information for identifying pixel value predicting means of which the predicted pixel value is judged by the coincidence judging means to attain coincidence and the error which is calculated by the prediction error calculating means;
   error coding means for coding the identification information and the error which are output by the selecting means; and
   outputting means for outputting a code which is coded by the coding means.

9. An image coding and decoding apparatus comprising:
   a pixel value changing section for changing a pixel value of a current pixel in an image data;

an error distributing section for distributing an error value produced in the pixel value changing section to neighbour pixels;

an image coding section for coding the pixel value which is changed by the pixel value changing section; and an image decoding section for decoding the code of the image coding section, wherein the pixel value changing section changes the pixel value so as to reduce a code quantity in the image coding section.

10. An image coding method comprising the steps of:

changing a pixel value of a current pixel in an image data;

distributing an error value produced in the pixel value changing step to neighbour pixels; and coding the pixel value which is changed by the pixel value changing step, wherein in the pixel value changing step, the pixel value is changed so as to reduce a code quantity in the image coding step.

* * * * *